Patented Mar. 26, 1929.

1,706,674

UNITED STATES PATENT OFFICE.

GEORGE H. OSGOOD, OF TACOMA, WASHINGTON.

WATERPROOFING VEGETABLE PROTEIN-BASE GLUE.

No Drawing.   Application filed August 11, 1926.   Serial No. 128,627.

The object of my invention is to increase the water-resistance of protein-base vegetable glues, adapted to be used in the manufacture of wooden articles, whereby a glue which is of great strength and high water resistance, and which is cheap to make, may be obtained. A further object is to change the color of such a glue to a shade similar to that of the wood on which it is used, thereby eliminating the objectionable feature of the dark line, displayed by the layer of glue at the joint, common in such vegetable protein-base glues.

My invention consists in incorporating a water-proof adhesive, not soluble in water into a vegetable protein-base glue. As a sample of such a glue compound, the mixture may be composed of a high protein-content vegetable meal, such as peanut meal, cottonseed meal, or linseed meal, with hydrated lime, sodium carbonate, sodium silicate, an adhesive commonly known as rubber cement and comprising gum damar, commercial asphalt, sulphur, and soluble in carbon bisulphide. In place of the gum damar any of the resinous gums which are soluble in carbon bisulphide, such as guttapercha, gum mastic, gum elemi, or Norway pitch may be used, if desired.

Such a glue may be prepared for use by either one of two methods, namely, all the ingredients (the sodium silicate being in a powdered form), except the carbon bisulphide, may be mixed together and shipped or held in bulk until needed for use, when the said dry mixture is stirred, together with the liquid carbon bisulphide, into the required quantity of water for a sufficient time to permit the materials to be dissolved and thoroughly mixed into a homogeneous mass; or, the several ingredients may be separately dissolved, in the water or in the carbon bisulphide as the case may be, and the resulting liquids then thoroughly stirred together into a homogeneous and smooth fluid. In either case the amount of water used in making the glue mixture may be varied somewhat to change the fluidity, but it will be found that if the water weighs about two-and-a-half times the weight of the other materials a glue of good viscosity will be obtained.

The proportions of the ingredients in the above example of such a glue may be:—A high protein-content vegetable meal, such as peanut meal, cottonseed meal, or linseed meal, one hundred parts; hydrated lime, sixteen parts; sodium carbonate, ten parts; sodium silicate, twenty parts; gum damar, or other equivalent gum, as above stated, one-and-a-half parts; asphalt, one part; sulphur, one-fourth part; and carbon bisulphide, about two-and-three-quarter parts. The total quantity of water used to give the glue a usual degree of fluidity would be about three-hundred-and-eighty parts.

The preparation thus produced needs no warming or cooking to make it ready for use and it can be applied to the wood at any time within twenty-four hours after the mixture has been prepared.

The vegetable meal used in such a glue is the ordinary commercial product. The hydrated lime and the sodium carbonate are both effective in bringing the meal into solution. The sodium silicate is both a solvent and a filler. The gum damar, asphalt and sulphur should be in a finely powdered form. The vegetable meal, lime, sodium carbonate, and sodium silicate form a mixture soluble in water, and the gum damar, asphalt, and sulphur form a mixture which is soluble in the carbon bisulphide. The gum damar, asphalt, sulphur, and carbon bisulphide form a gummy mass which renders the entire glue practically impervious to water, when it is dry. The adhesive quality of such a glue is derived from the protein of the meal, and the waterproofing thereof is derived from the gummy mass.

After the gums are dissolved by the carbon bisulphide they are absorbed by the protein in the meal, and change the color of the glue from brown to a dark yellow, thus making the adhesive quality of the meal (protein) an insoluble rubber-like material, when set, having a color substantially similar to the wood to which it is applied.

I claim:—

1. A homogeneous water-resistant, strong glue, comprising a high protein-content vegetable meal, hydrated lime, sodium carbonate, and sodium silicate, all dissolved in water; together with small amounts of gum damar, asphalt, and sulphur, dissolved in carbon bisulphide, and mixed with the materials dissolved in water.

2. A homogeneous water-resistant, strong glue, comprising a mixture of one-hundred parts of a high protein-content vegetable meal, about sixteen parts of hydrated lime, ten parts of sodium carbonate, twenty parts of sodium silicate, dissolved in about three-hundred-and-eighty parts of water; together with one-and-a-half parts of gum damar, one part of asphalt, and one-fourth of a part of sulphur, dissolved in about two-and-three-quarters parts of carbon bisulphide, and mixed with the materials dissolved in the water.

GEORGE H. OSGOOD.